(12) United States Patent
Boxell et al.

(10) Patent No.: US 12,530,819 B2
(45) Date of Patent: Jan. 20, 2026

(54) GENERATIVE MODEL FOR ITEM IMAGE SELECTION

(71) Applicant: Maplebear Inc., San Francisco, CA (US)

(72) Inventors: Levi Boxell, Brownsburg, IN (US); Tilman Drerup, Palo Alto, CA (US)

(73) Assignee: Maplebear Inc., San Francisco, CA (US)

( * ) Notice: Subject to any disclaimer, the term of this patent is extended or adjusted under 35 U.S.C. 154(b) by 138 days.

(21) Appl. No.: 18/510,560

(22) Filed: Nov. 15, 2023

(65) Prior Publication Data
US 2025/0157089 A1    May 15, 2025

(51) Int. Cl.
| | |
|---|---|
| *G06T 11/00* | (2006.01) |
| *G06F 16/56* | (2019.01) |
| *G06F 16/953* | (2019.01) |
| *G06N 3/0475* | (2023.01) |
| *G06Q 30/0601* | (2023.01) |

(52) U.S. Cl.
CPC .............. *G06T 11/00* (2013.01); *G06F 16/56* (2019.01); *G06F 16/953* (2019.01); *G06N 3/0475* (2023.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 10,860,196 | B1* | 12/2020 | Nichoson | G06F 3/0481 |
| 2004/0111321 | A1* | 6/2004 | Kargman | G06Q 30/02 |
| | | | | 705/16 |
| 2011/0254840 | A1* | 10/2011 | Halstead | G06T 15/04 |
| | | | | 345/421 |
| 2022/0075994 | A1* | 3/2022 | Shapira | G06N 3/08 |
| 2022/0343408 | A1* | 10/2022 | Ahn | G06Q 30/0643 |
| 2022/0398806 | A1* | 12/2022 | Arksey | H04B 17/27 |
| 2025/0077765 | A1* | 3/2025 | Xu | G06F 40/56 |
| 2025/0078323 | A1* | 3/2025 | Paliarush | G06T 11/00 |

OTHER PUBLICATIONS

Amazon, "New generative AI from Amazon enables advertisers to up their game and create more engaging ads," Oct. 25, 2023, 4 pages, Retrieved from the internet <URL:https://www.aboutamazon.com/news/innovation-at-amazon/amazon-ads-ai-powered-image-generator>.

* cited by examiner

*Primary Examiner* — Joni Hsu
(74) *Attorney, Agent, or Firm* — Fenwick & West LLP

(57) ABSTRACT

A system generates item images using an item image generation model. The system receives a prompt for the model. The prompt is configured to request the model generate item images for an item. The system executes the model using the prompt to generate a set of item images. The system evaluates each of the set of item images to determine performance data of each of the set of item images. The system iteratively improves the set of item images by performing the following steps. The system updates the prompt based on the performance data of each of the set of item images to obtain a new prompt. The system executes, using the new prompt, the model to generate a new set of item images, and the system evaluates the new set of item images to determine performance data of each of the new set of item images.

20 Claims, 9 Drawing Sheets

260

GENERATIVE MODEL FOR ITEM IMAGE SELECTION

BACKGROUND

The quality of item images in an online catalog are an important aspect of a user's online experience. Conventionally, item images for online catalogs are captured manually (e.g., a photographer is hired to photograph various products). Moreover, different versions of item images are often captured, where the item is staged differently from other images of that item. This allows the online system to determine which particular staging of the product is most likely to result in a particular outcome (e.g., user selection and use of the item). But this is a manual process, which does not scale and can be quite expensive (both in time and money) for large online catalogs. Accordingly, using conventional processes, a lot of time and money can be spent on imaging items and testing the images of the items in order to select an item image for presentation in the online catalog. Moreover, the process of selecting a "best" image from multiple candidate images is also manual, so it is based on a human operator's subjective understanding of quality and lacks a foundation in actual performance of the images.

SUMMARY

In accordance with one or more aspects of the disclosure, a system (e.g., an online concierge system) may generate item images that can be provided to a search engine for displaying along with search results, in a browsing window to be displayed with other item images, or in any other user interface where item images are displayed when presenting information about a corresponding set of items. The item images may be associated with, e.g., different items listed in an online catalog. For example, the system receives a prompt (e.g., that includes text description of an item) configured to request an item image generation model to generate one or more item images for the item. The item image generation model may be a generative artificial intelligence model that generates images of items responsive to a text based input (e.g., "an apple," "a sliced apple," "an apple with a bite out of it," etc.). The item image generation model is executed based on the prompt to generate one or more item images. The system may provide the generated one or more item images to the search engine.

The item image generation model may be trained to generate item images that are tailored to satisfy one or more performance metrics (e.g., probability of sale for the item is above a threshold). In some embodiments, the system receives a prompt configured to request an item image generation model to generate item images for an item. The item image generation model is executed based on the prompt to generate a set of item images. The system evaluates each of the set of item images to determine their performance data.

In some embodiments, the system iteratively improves the set of item images as follows. The system may update the prompt based on the performance data of each of the set of item images to obtain a new prompt. For example, the system may apply the prompt and the performance data of each of the set of item images to a machine learned model (e.g., prompt generation model) to determine the new prompt. The system may execute, using the new prompt, the item image generation model to generate a new set of item images. The system may evaluate the new set of item images to determine performance data of each of the new set of item images. The system may perform these steps iteratively to improve the item images that are generated for the item.

In some embodiments, the system iteratively improves the set of item images by training the item image generation model using at least the performance data of each of the set of item images to generate improved item images.

DETAILED DESCRIPTION

Figure 1A:
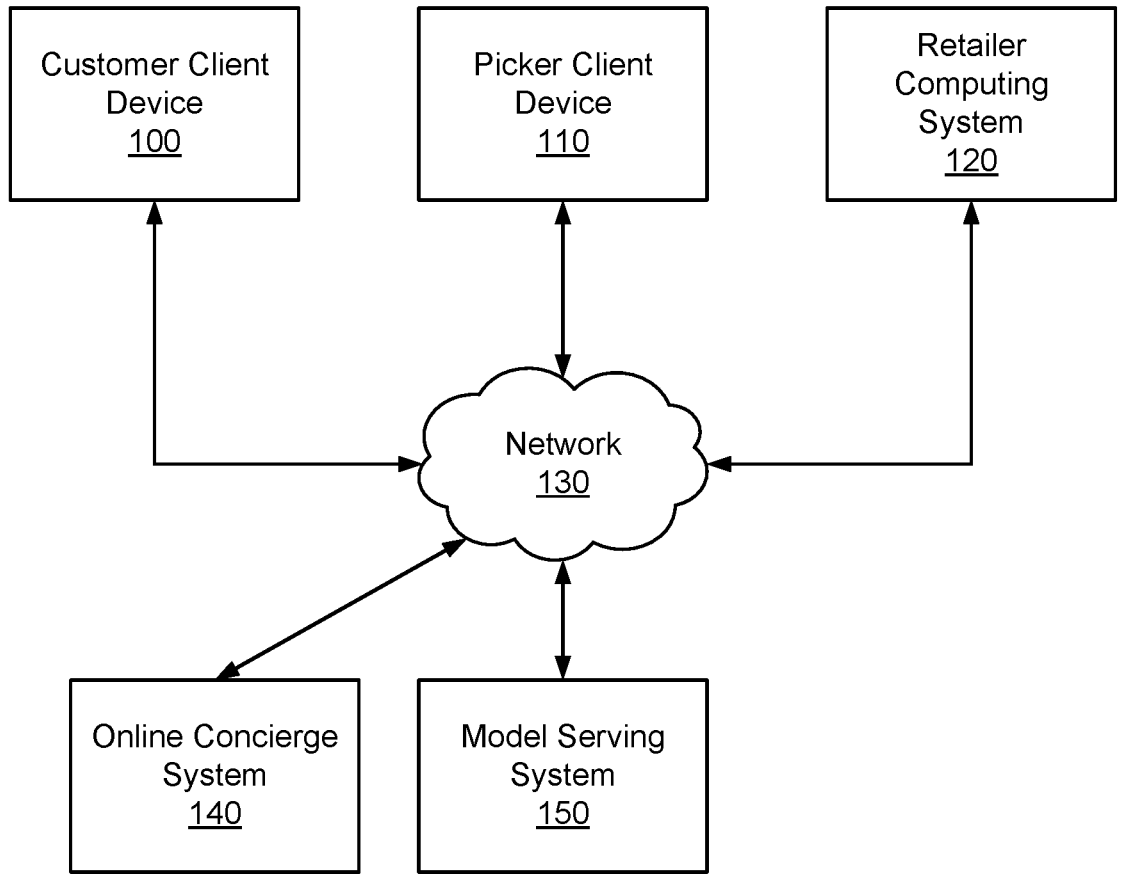
FIG. 1A illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, an online concierge system 140, and a model serving system 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The model serving system 150 receives requests from the online concierge system 140 to perform tasks using machine-learned models. The tasks include, but are not limited to, item image generation tasks, natural language processing (NLP) tasks, audio processing tasks, image processing tasks, video processing tasks, item image evaluation tasks, and the like. In one or more embodiments, the machine-learned models deployed by the model serving system 150 are models configured to perform one or more item image generation tasks and/or NLP tasks (e.g., prompt generation). The item image generation tasks may be performed by, e.g., an item image generation model. The item image generation model is a generative artificial intelligence (AI) model. The item image generation tasks include generation of one or more item images responsive to a received prompt (e.g., a text description of an item). The NLP tasks include, but are not limited to, text generation (e.g., prompt generation via a prompt generation model), query processing, machine translation, chatbots, and the like. In one or more embodiments, the item image generation model and/or the prompt generation model may be configured as a transformer neural network architecture. In some embodiments, the item image generation model and/or the prompt generation model is coupled to receive sequential data tokenized into a sequence of input tokens and generates one or more item images.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the item image generation model may receive a sequence of input tokens that represent a query to generate one or more images for an item. The item image generation model generates one or more item images in response to the query. For a prompt generation task, the prompt generation model may use a prompt and performance data associated with item images (the item images were generated using the item image generation model using the prompt) to generate an improved prompt for use with the item image generation model.

In some embodiments the item image generation model is a machine-learned model. In these embodiments, the sequence of input tokens or output tokens can be arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the item image generation model and/or the prompt generation model are large language models (LLMs) that are trained on a large corpus of training data to generate outputs for their respective tasks. An LLM may be trained on massive amounts of text data, image data, etc., often involving billions of words or text units and/or images. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include item images, performance data associated with item images, item identifiers, prompts, websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Figure 1B:
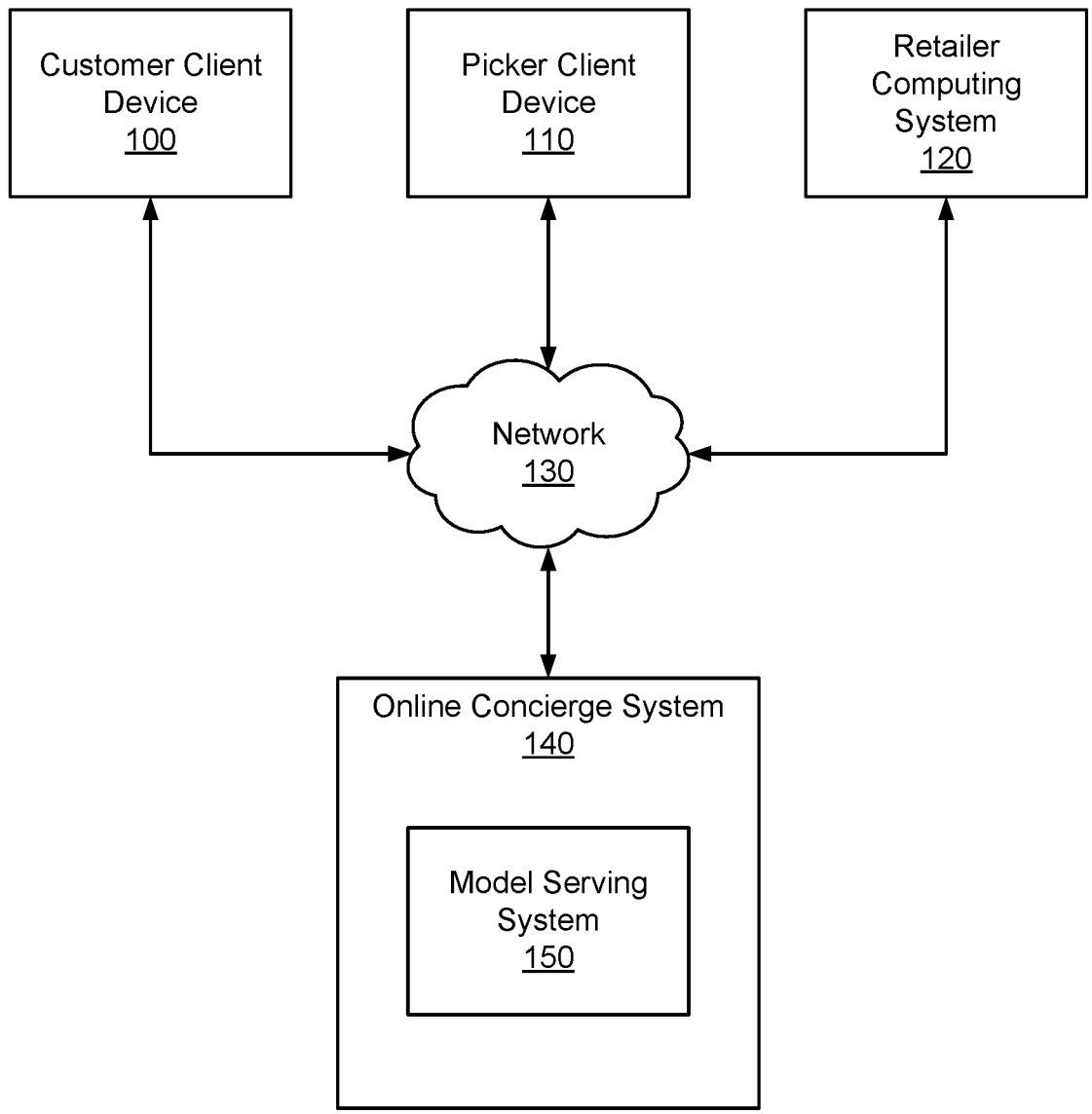
FIG. 1B illustrates another example system environment for an online concierge system, in accordance with one or more embodiments.

FIG. 1B illustrates another example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 is managed by a separate entity from the online concierge system 140. In one or more embodiments, as illustrated in the example system environment in FIG. 1B, the model serving system 150 is managed and deployed by the entity managing the online concierge system 140.

Figure 2A:
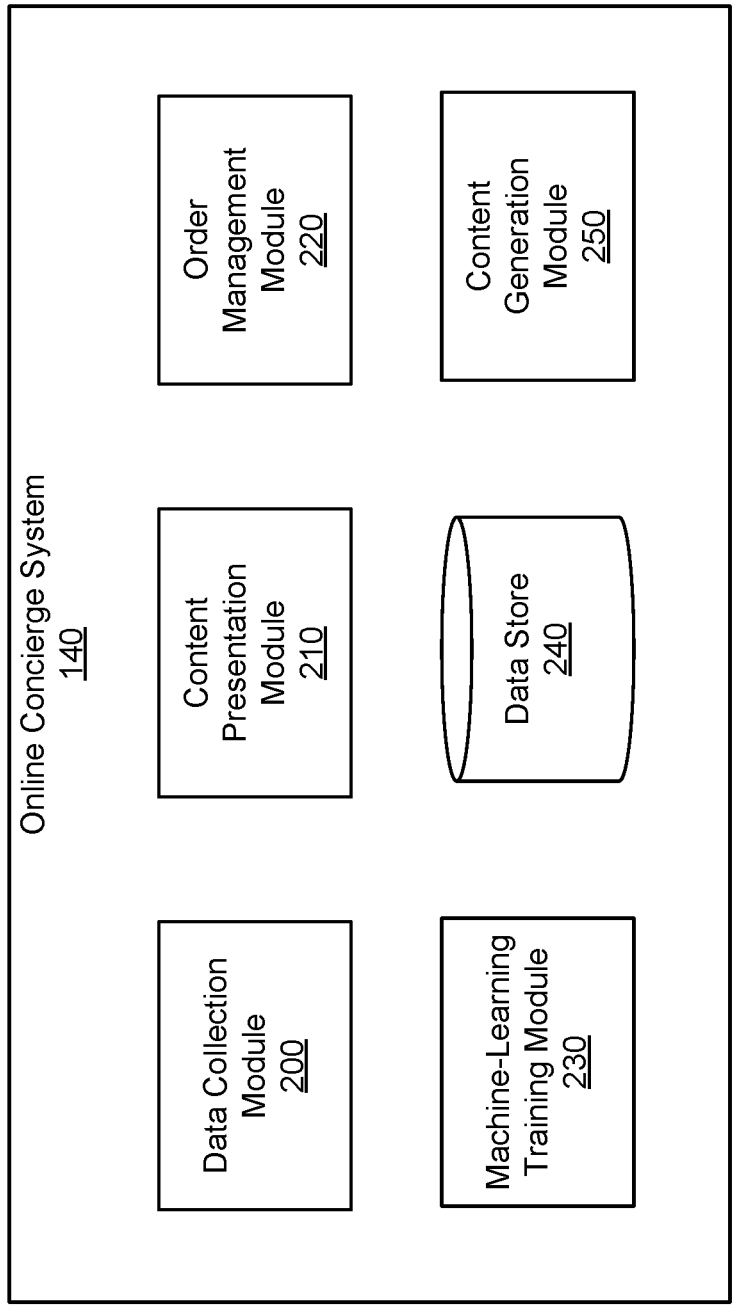
FIG. 2A illustrates an example system architecture for an online concierge system, in accordance with one or more embodiments.

FIG. 2A illustrates an example system architecture for an online concierge system 140, in accordance with one or more embodiments. The system architecture illustrated in FIG. 2A includes a data collection module 200, a content presentation module 210, an order management module 220, a machine learning training module 230, a data store 240, and a content generation module 250. Alternative embodiments may include more, fewer, or different components from those illustrated in FIG. 2A, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. The item images that are presented for particular items may be generated by the content generation module 250 as described below. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. For example, the machine learning training module 230 may train the item selection model, the availability model, the item image generation model, the prompt generation model, any of the machine-learned models deployed by the model serving system 150, or some combination thereof. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In one or more embodiments, when the model serving system 150 is included in the online concierge system 140, the machine learning training module 230 may further train parameters of the machine-learned model based on data specific to the online concierge system 140 stored in the data store 240. As an example, the machine learning training module 230 may obtain a pre-trained transformer language model and further fine tune the parameters of the transformer model using training data stored in the data store 240. The machine learning training module 230 may provide the model to the model serving system 150 for deployment.

The content generation module 250 generates content, for example, item images that are provided to a search engine for displaying with search results. The content generation module 250 generates item images using, e.g., an item image generation model as described below with regard to, e.g., FIGS. 3-7. In some embodiments, the content generation module 250 interfaces with a content testing system 350 to evaluate or test the content generated, for example, item images generated. Details of the interactions with the content testing system 350 are further illustrated in FIG. 3 and described in connection with FIG. 3.

Note that the content generation module 250 may generate item images for some or all items of an online catalog. For example, for a small online catalog, it may not be too computationally and/or temporally expensive to iteratively improve the item images (referred to as improved item images) associated with the items in the online catalog. However, an online catalog can be quite large and cover, e.g., tens of thousands of items. In these cases, it can take a lot of time and money to improve the item images of all items in the online catalog.

In some embodiments, to mitigate the financial and/or temporal costs of improving item images associated with items of an entire online catalog, the content generation module 250 improves item images for a subset of the items of the online catalog. The content generation module 250 may leverage knowledge of how improved item images were generated (by the item image generation model) in order to generate item images for items that are not part of the subset. For example, the content generation module 250 may select a candidate item that is not part of the subset, but has at least a threshold similarity to an item in the subset. The content generation module 250 may compare the candidate item to the items of the subset using product embeddings. For example, the content generation module 250 may base the selection on a feature vector of the candidate item being within a threshold similarity of a feature vector of the item in the subset. In embodiments where there is at least a threshold similarity, the content generation module 250 may instruct the item image generation model to generate an item image for the candidate item in the same manner as the item image that had been improved for the item in the subset (except that it is for the candidate item and not the item). For example, the online concierge system may use a feature vector of a final improved item image for the item in the subset to determine a feature vector for an item image of the candidate item. Note that this allows the online concierge system to leverage improved images for items (e.g., cucumbers) to generate similar images for similar items (e.g., zucchinis) without having to run those similar items through a potentially time intensive improvement process.

Note as mentioned above there are financial and/or temporal costs of improving item images associated with items. Another way to mitigate these costs is for the content generation module 250 to select, for generation of improved item images, items that strongly benefit from iteratively improving their associated item images. For example, iteratively improving item images for a first item may result in a 1% increase in item selection by a customer, whereas iteratively improving item images for a second item may result in a 20% increase in item selection by a customer.

In one or more embodiments, the iterative algorithm first take a random subset of items and generate candidate images. The algorithm then measures the performance (e.g., cart adds) of those candidate images. Using the measured performance of the candidate images, the algorithm trains a model (e.g., XGBoost, neural network, or the like) on the subset of images with the performance data to predict the performance of the images using input features, such as product embeddings, category, organic indicator, etc. Once the performance prediction model is trained, the algorithm generates performance predictions for other items in the catalog. Finally, the algorithm applies a threshold or other rule to select items for image improvements that are predicted to have a performance gain above the threshold or other criteria.

For example, the content generation module 250 may predict that iteratively improving a set of item images for an item is expected to increase a value of a performance metric by at least a threshold value (e.g., at least 5%), and if the value is performance metric exceeds the threshold value, proceed with iteratively improving a set of item images for that item (e.g., as described below with regard to FIGS. 5-7). Likewise, if the value of the performance metric does not satisfy the threshold value, the content generation module 250 may use a single prompt to generate one or more candidate item images using the item image generation model. The content generation module 250 may associate an item image from the one or more candidate item images with the item. The item image may then be, e.g., available to a search engine for providing to users along with a search result returned in response to a search query processed by the search engine.

Figure 2B:
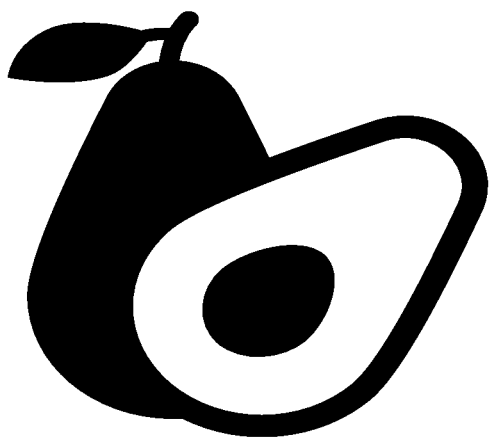
FIG. 2B shows an example item image that was generated by a content generation module, in accordance with one or more embodiments.

FIG. 2B shows an example item image 260 that was generated by the content generation module 250, in accordance with one or more embodiments. In one or more embodiments, as illustrated, the item image 260 is for a particular item (e.g., avocados), and the particular item is staged in the item image 260 in a particular manner. As described herein, the content generation module 250 generated the item image in the particular staging to meet one or more performance metrics (e.g., probability of sale of at least a threshold value). For example, the item image 260 presents a whole avocado in the background, a half avocado in the foreground, and the item is not packaged. The item image 260 is part of an online catalog. Responsive to receiving a search query (e.g., for an avocado, produce, etc.), the online concierge system 140 may return the item image 260 along with search results in response to a search query.

Figure 3:
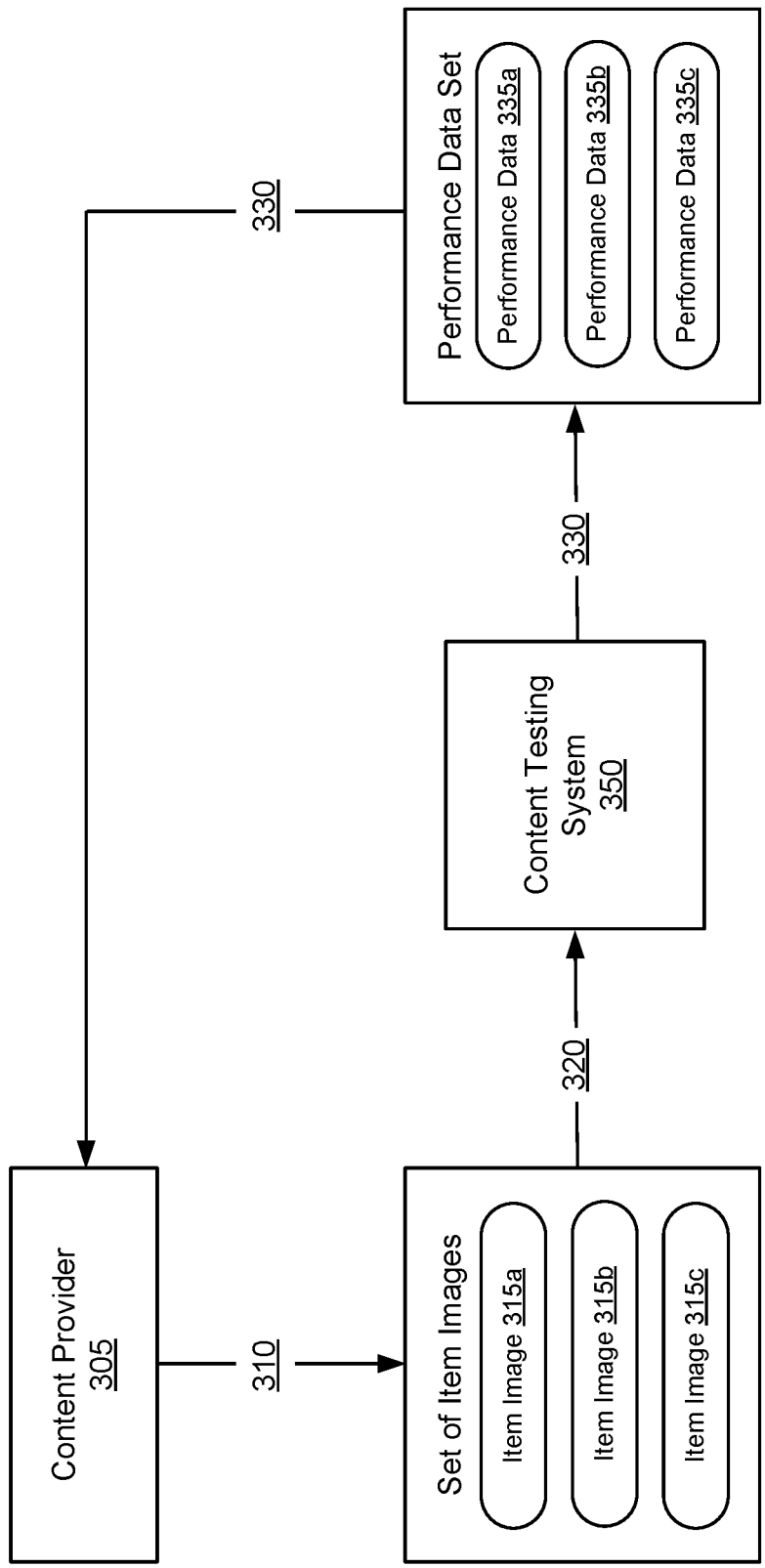
FIG. 3 illustrates interactions of a content testing system with a content provider system such as the online concierge system, in accordance with one or more embodiments.

FIG. 3 illustrates the interactions of a content testing system 350 with a content provider system such as the online concierge system 140, according to one or more embodiments. The content testing system 350 tests different variants of content (e.g., item images) and collects data on their respective performance. Alternative embodiments may include more, fewer, or different modules from those illustrated in FIG. 3. Steps indicated as being performed by a particular module may be performed by other modules than those indicated herein. Additionally, in some embodiments, some or all of the functionality of the content testing system 350 may be performed by the content provider 305.

In step 310, a content provider 305 (for example, the content generation module 250 of the online concierge system 140) receives a prompt for an item image generation model. The prompt is configured to request an item image generation model generate item images for an item. The content provider 305 executes the item image generation model using the prompt to generate a set of item images (e.g., item image 315a, item image 315b, and item image 315c). The set of item images that are generated include representations of the item staged in different manners (e.g., different backgrounds, packaged or not packaged, form prior to preparation for consumption (e.g., unsliced) or form after preparation for consumption (e.g., sliced), different number of the items, etc.). In step 320, the content provider 305 submits the set of item images to the content testing system 350.

In step 330, the content testing system 350 runs tests to evaluate each of the set of item images to determine performance data for the item image 315a, the item image 315b, and the item image 315c. In some embodiments, the content testing system 350 may, e.g., randomize the item images across users. The content testing system 350 may use A/B testing and/or multi-armed bandit algorithms (including contextual bandit algorithms) to evaluate performance of item images. The content testing system 350 returns a performance data set describing the performance of individual item images (e.g., in the form of a table), where performance is presumed to be a quantitative measure (e.g., number of clicks, probability of sale, etc.). In some embodiments, the performance data for an item image that was evaluated may also include, e.g., the evaluated item image (e.g., the item image 315a), an identifier for the evaluated item image, an item identifier for the item associated with the item image, the prompt used to generate the evaluated item image, some other information relevant to the evaluation, or some combination thereof. Accordingly, the content testing system 350 returns performance data (e.g., 335a, 335b, and 335c) for the item images to, e.g., allow comparison of different item images. The performance data identifies the item image along with their performance metrics. In some embodiments, the performance data may rank the item images based on the performance metrics, for example, sort them in decreasing order of performance.

Figure 4:
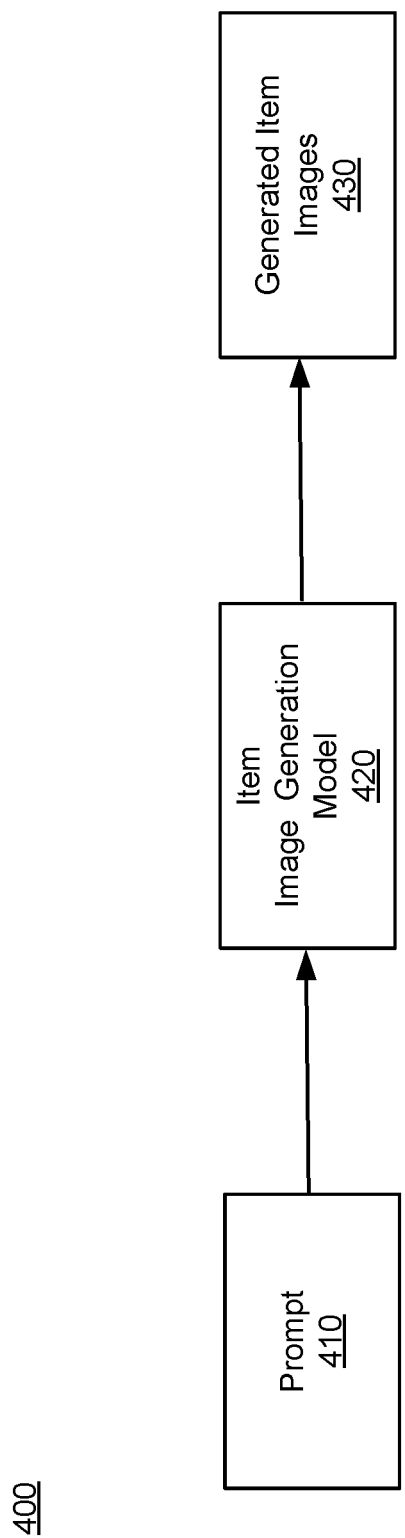
FIG. 4 shows a system for querying a machine learned item image generation model using a prompt, according to one or more embodiments.

FIG. 4 shows a system for querying a machine learned item image generation model using a prompt, according to one or more embodiments. The system comprises a machine learned item image generation model (for example, a LLM) and is referred to as the item image generation model 420. The item image generation model 420 can be queried using a prompt 410. The prompt 410 may be a structured prompt. The prompt is configured to request the item image generation model 420 to generate at least one item image for an item. The prompt may be text based such that it includes a text description for an item. For example, "an aesthetically pleasing image of a carrot."

Given the prompt, the item image generation model 420 generates 430 one or more item images for the item. The set of item images includes at least one item image. Note that the input of the item image generation model 420 is text and does not include an image, and the output of the item image generation model 420 is one or more item images. In other embodiments, the image generation model 420 is multimodal and receives both text and one or more images, and the output of the item image generation model 420 is one or more item images. Regardless, the item image generation model 420 is actually creating the item images; it is not simply searching a database of images and returning one of existing images in the database.

Figure 5:
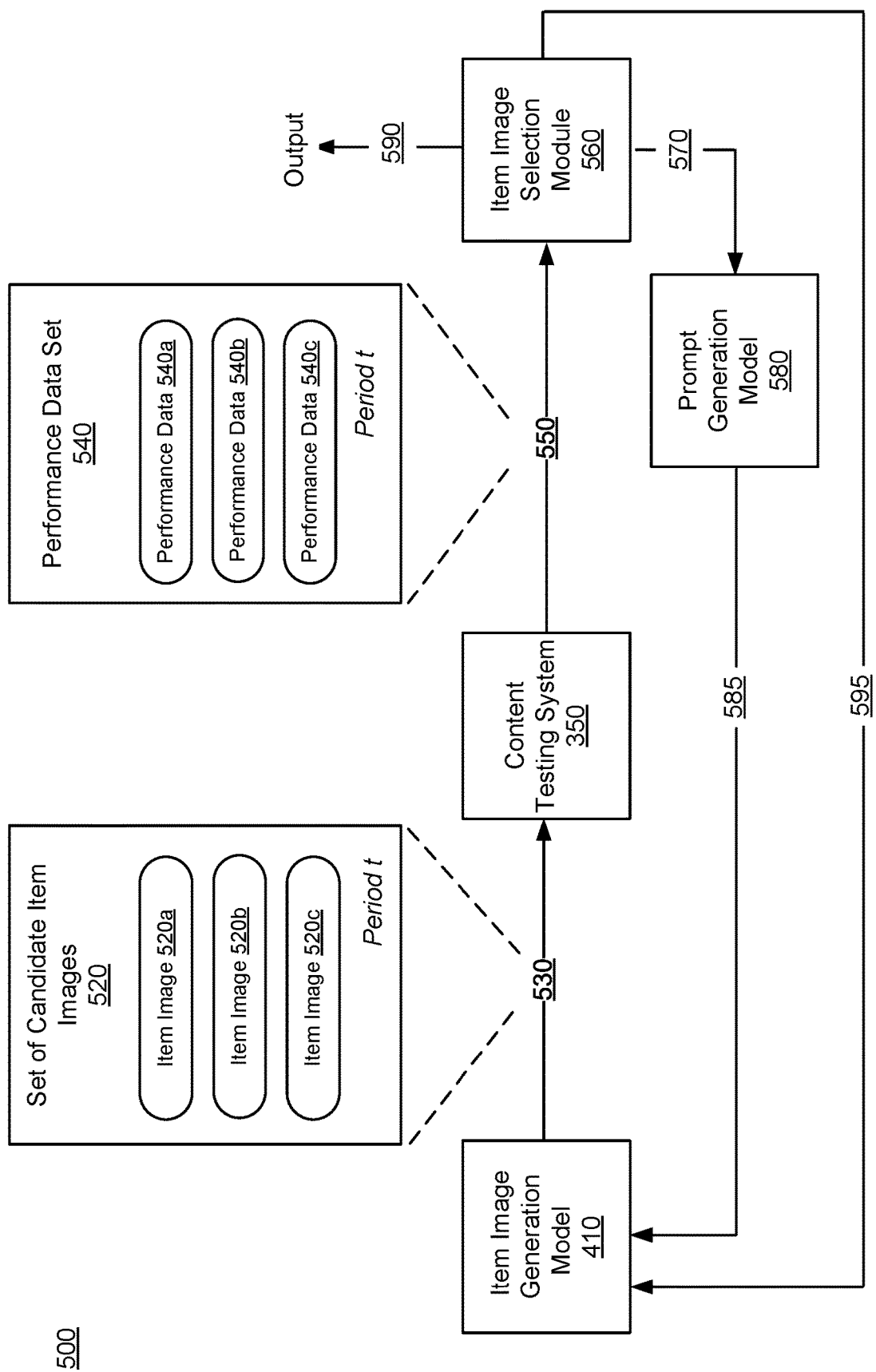
FIG. 5 illustrates an example iteration of using an item image generation model to generate improved item images, in accordance with one or more embodiments.

FIG. 5 illustrates an example iteration 500 of using the item image generation model 420 to generate improved item images, in accordance with one or more embodiments. At a period t−1, a prompt was provided to the item image generation model 420. The prompt is configured to request the item image generation model 420 generate one or more item images for an item. For example, the prompt may be to generate some item images for a particular item (e.g., milk, shampoo, etc.). The prompt is applied to the item image generation model 420 to generate a set of candidate item images 520. The set of candidate item images 520 may for example, include item image 520*a*, item image 520*b*, and item image 520*c* of the item staged in different ways. Staging describes how an item is visually presented in an item image. In some embodiments a single variable (e.g., packaging, orientation, background, prepared v. unprepared, etc.) is different in the staging of each of the candidate item images of the set of candidate item images 520. In other embodiments, there are multiple variables that are different in the staging of each of the candidate item images of the set of candidate item images 520.

The candidate item images are input 530 into the content testing system 350. The content testing system 350 evaluates each of the set of item images to determine performance data of each of the set of item images. After evaluating the set of candidate item images 520, the content testing system 350 returns a performance data set 540. The performance data set 540 includes performance data (e.g., performance data 540*a*, performance 540*b*, and performance data 540*c*) describing performance of the evaluated item images (e.g., the item images 520*a*, 520*b*, 520*c*). In some embodiments, the performance data for an item may also include, e.g., the evaluated item image, identifier for the evaluated item image, identifier for an item associated with the evaluated item image, the prompt used to generate the evaluated item image, some other information relevant to the evaluation, or some combination thereof.

The performance data set 540 is input 550 into an item image selection module 560. The item image selection module 560 may be part of, e.g., the online concierge system 140 (e.g., part of the content generation module 250 and/or the machine learning training module 230). The item image selection module 560 determines whether the performance data of one or more of the evaluated item images satisfies one or more performance metrics (e.g., meets at least a threshold value for the one or more performance metrics). Performance metrics are measures used to describe performance of an item image generated by the item image generation model 420. Performance metrics may include, e.g., a probability that a customer would select an item after being shown an item image (e.g., a click or cart addition), a probability that a customer would purchase an item after being shown the item image, some other metric relevant to predicting performance of an item image, or some combination thereof.

In embodiments, where an item image of the set of candidate item images 520 meet the one or more performance metrics, the item image selection module 560 selects the item image and outputs 590 the item image (e.g., may then be associated with the item in an online catalog). In some embodiments (e.g., if none of the performance data set 540 satisfies the one or more performance metrics), the performance data set 540 is input into a prompt generation model 580.

The prompt generation model 580 updates the prompt based on the performance data of each of the set of candidate item images 520 to obtain a new prompt. The prompt generation model 580 may be part of, e.g., the online concierge system 140 (e.g., part of the content generation module 250). The prompt generation model 580 may be, e.g., a LLM that generates one or more updated prompts based on received performance data. For example, the prompt generation model 580 may generate at least one updated prompt based on the performance data set 540. In some embodiments, the prompt generation model 580 may randomly generate prompts. The prompt generation model 580 may randomly generate prompts without considering the performance of the set of candidate item images 520. This may be useful to, e.g., more fully explore the set of possible item images for an item.

The one or more updated prompts are applied 585 to the item image generation model 420 to generate a new set of candidate item images as part of a next iteration (i.e., t+1). This process is continued for each subsequent time period to generate a new set of candidate item images that are likely to have better performance compared to the set of item images generated during the previous period.

In some embodiments, instead of using the prompt generation model 580 to fine tune the structure of prompts provided to the item image generation model 420, the item image generation model 420 is directly trained to output improved item images for a given prompt. For example, the item image selection module 560 may use the performance data set 540 to train 595 the item image generation model 420. In this manner, item image generation model 420 can learn the set of weights that generate item images which are appealing to customers.

Note, the item image selection module 560 may use selection functions that explicitly control an amount of exploration done by the system. The more conservative the selection function, the less the system experiments with new item images.

According to one or more embodiments, the system tests the newly generated prompts against old prompts and potential alternatives. The results of these tests can be provided as input to the prompt generation model 580 as additional context describing which types of prompts perform better to guide the prompt generation model 580 in the generation of improved prompts.

An expert user, for example, an ad campaign designer may manually edit the prompts to ensure that an ad campaign stays within certain parameters. For example, if an ad campaign is supposed to have a particular theme (e.g., "Christmas feel") to it, the expert user may intervene if the prompt or the candidate item images deviate from that theme.

The system may be massively scalable. Furthermore, the system may also consider contextual information. In one or more embodiments, the process executed by the system is localized and generates item images suitable for a particular geographical region (or a specific demographics of users) that can be used as a targeting criterion on the ad platform. For example, the item images generated may be different for one state (e.g., Texas) compared to item images generated for a different state (e.g., California). Similarly, item images generated for a particular age group of users may be different compared to a different age group. Similarly, item images generated for a male users may be different from item images generated for female users. The system is configurable and can be configured to generate item images for different granularity of user groups depending on the user groups allowed by the ad platform for targeting.

Figure 6:
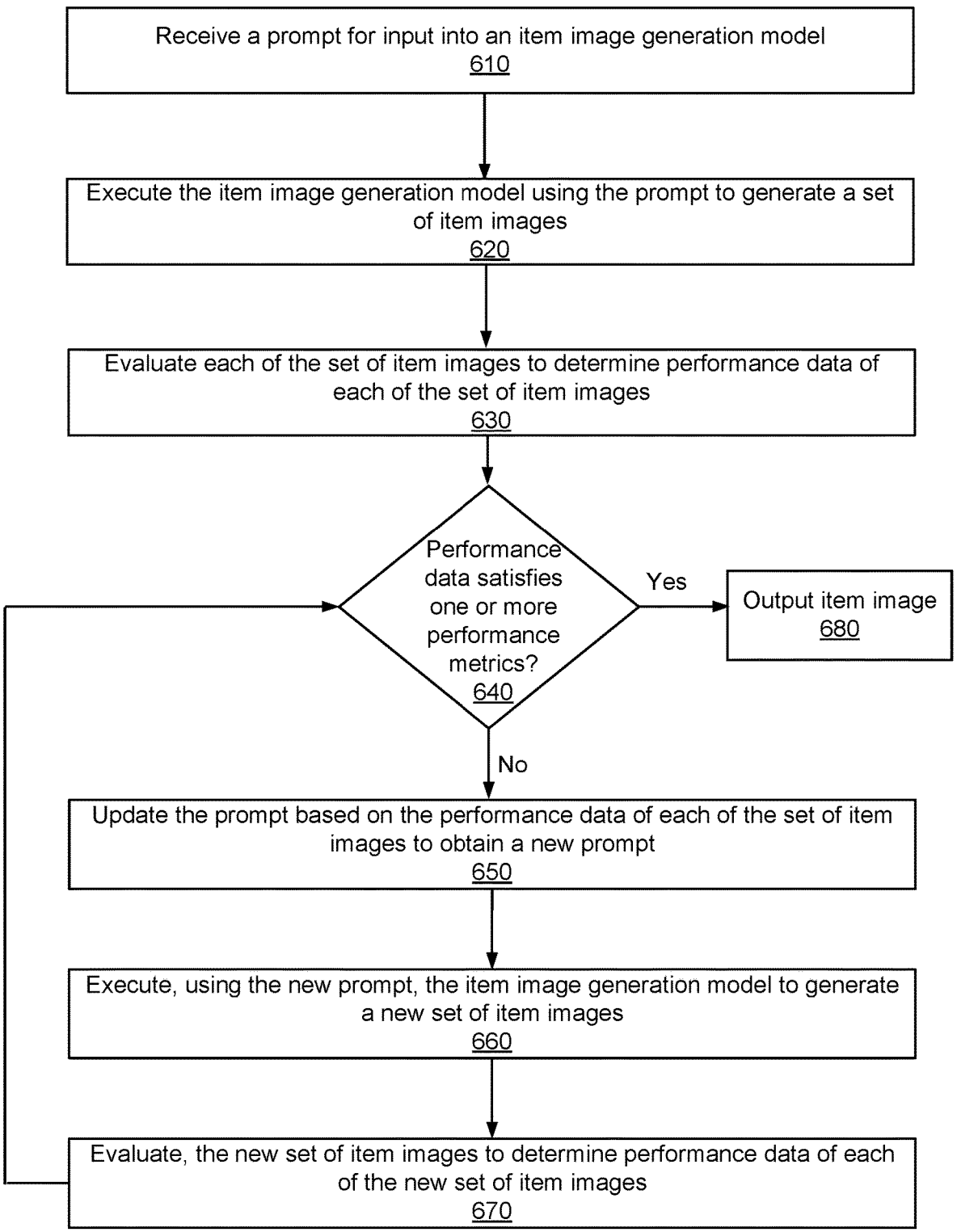
FIG. 6 is a flowchart for a method of using an item image generation model and a prompt generation model for item image selection, in accordance with some embodiments.

FIG. 6 is a flowchart for a method 600 of using an item image generation model and prompt generation model for item image selection, in accordance with some embodiments. Alternative embodiments may include more, fewer, or different steps from those illustrated in FIG. 6, and the steps may be performed in a different order from that illustrated in FIG. 6. These steps may be performed by an online concierge system (e.g., online concierge system 140). Additionally, each of these steps may be performed automatically by the online concierge system without human intervention.

The online concierge system receives 610 a prompt for input into an item image generation model. The prompt is configured to request the item image generation model to generate item images for an item. The prompt may include a text description for an item. For example, "an aesthetically pleasing image of a carrot."

The online concierge system executes 620 the item image generation model using the prompt to generate a set of item images. Given the prompt, the item image generation model generates a set of item images for the item. The set of item images includes at least one item image.

The online concierge system evaluates 630 each of the set of item images to determine performance data of each of the set of item images. The online concierge system may evaluate each of the set of item images using a content testing system (e.g., the content testing system 350).

The online concierge system determines 640 whether performance data for any item image satisfies one or more performance metrics. The online concierge system may make the determination using an item image selection module (e.g., the item image selection module 560). For example, the online concierge system may determine whether any item images being associated with at least a threshold probability of a customer selecting the item for purchase after being shown the item image.

In some embodiments (e.g., where the one or more performance metrics have not been met), the online concierge system iteratively improves the set of item images by performing a set of steps. The online concierge system updates 650 the prompt based on the performance data of each of the set of item images to obtain a new prompt. The online concierge system may update the prompt using, e.g., a prompt generation model (e.g., the prompt generation model 580). Some or all of the performance data may be used by the prompt generation model to determine the new prompt. The online concierge system may, e.g., apply the prompt and the performance data of each of the set of item images to a machined learned model to determine the new prompt.

The online concierge system executes 660, using the new prompt, the item image generation model to generate a new set of item images.

The online concierge system evaluates 670 the new set of item images to determine performance data of each of the new set of item images. The online concierge system may evaluate each of the new set of item images using the content testing system.

The online concierge system repeats steps 640-670 to generate improved item images. Once one or more performance metrics are met for a generated item image, the item image selection module may instruct the online concierge system to output 680 the item image that satisfies the one or more performance metrics. The output item image may then be associated with the item in, e.g., an online catalog, search results, etc. For example, in response to a search query made by a user through a search engine, the online concierge system may provide the item image (i.e., that was output at 680) to the search engine for providing to the user along with a search result returned in response to the search query. The online concierge system may also update the item image generation model and/or the prompt generation model based on the generated item image satisfying the one or more performance metrics.

Figure 7:
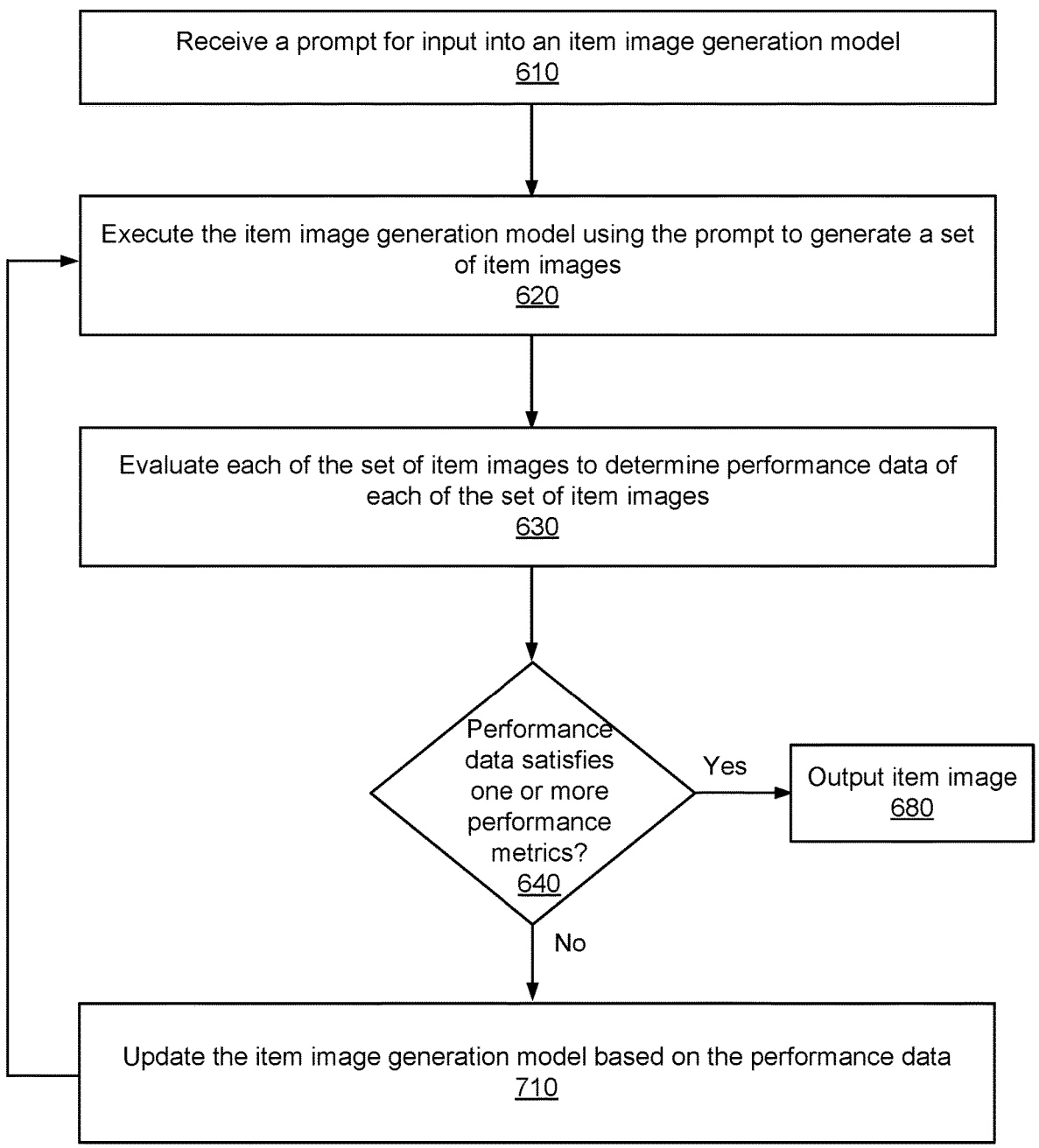
FIG. 7 is a flowchart for a method of using an item image generation model for item image selection, in accordance with some embodiments.

FIG. 7 is a flowchart for a method 700 of using an item image generation model for item image selection, in accordance with some embodiments. Alternative embodiments may include more, fewer, or different steps from those illustrated in FIG. 7, and the steps may be performed in a different order from that illustrated in FIG. 7. These steps may be performed by an online concierge system (e.g., online concierge system 140). Additionally, each of these steps may be performed automatically by the online concierge system without human intervention.

The method 700 is similar to the method 600, except that in the method 700 the item image generation model is being directly trained using the performance data. In the method 700 if the one or more performance metrics are not satisfied, the online concierge system updates 710 the item image generation model based on the performance data associated with the most recent iteration of item images. By updating the item image generation model with the performance data associated with the generated item images, the online concierge system is able to train the item image generation model to produce improved item images.

The online concierge system may repeat steps 710, 620, 630, and 640 to generate improved item images. Note once one or more performance metrics are met for a generated item image, the item image selection module may instruct the online concierge system to output 680 the item image that satisfies the one or more performance metrics.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising one or more processors and a non-transitory computer readable medium, the method comprising:
    receiving a prompt for an item image generation model, the prompt configured to request the item image generation model to generate item images for an item;
    executing the item image generation model using the prompt to generate a set of item images;
    evaluating each of the set of item images to determine performance data of each of the set of item images, wherein determining the performance data of a generated item image of the set of generated item images comprises:
        displaying the generated item image to a subset of users of an online system,
        logging actions performed by the subset of users after the generated item image is displayed to each of the subset of users, and
        computing a performance metric for the generated item image based on the logged actions; and
    iteratively updating the set of item images by performing a set of steps comprising:
        updating the prompt based on the performance metric of each of the set of item images to obtain a new prompt,
        executing, using the new prompt, the item image generation model to generate a new set of item images, and
        reevaluating the new set of item images to recompute performance data of each of the new set of item images.

2. The method of claim 1, wherein updating the prompt based on the performance metric of each of the set of item images to obtain a new prompt, comprises:
    applying the prompt and the performance data of each of the set of item images to a machined learned model to determine the new prompt.

3. The method of claim 1, further comprising:
    associating an item image from the new set of item images with the item, wherein the item image is provided to a search engine for providing to users along with a search result returned in response to a search query processed by the search engine.

4. The method of claim 1, further comprising:
    providing an item image from the new set of item images to a search engine for providing to users along with a search result returned in response to a search query processed by the search engine.

5. The method of claim 1, wherein executing the item image generation model using the prompt to generate a set of item images comprises executing the item image generation model using the prompt to generate: (1) an item image of the item where the item is packaged, and (2) an item image of the item where the item is not packaged.

6. The method of claim 1, wherein executing the item image generation model using the prompt to generate a set of item images comprises executing the item image generation model using the prompt to generate: (1) an image of the item depicting its form prior to preparation for consumption, and (2) an image of the item depicting its form after preparation for consumption.

7. The method of claim 1, wherein the item is described by a first feature vector, and a final improved image is generated for the item based in part on the new set of item images, the method further comprising:
    selecting a second item that is described by a second feature vector, and the selection based in part on the second feature vector having at least a threshold similarly score to the first feature vector;
    determining a feature vector for the final improved image for the item; and
    generating an item image for the second item using the feature vector for the final improved image for the item.

8. The method of claim 1, further comprising:
    prior to iteratively improving the set of item images, predicting that iteratively improving the set of item images for the item is expected to increase a value of the performance metric by at least a threshold value.

9. The method of claim 1, further comprising:
    training the item image generation model using the set of item images and the performance data of each of the set of item images.

10. A computer program product comprising a non-transitory computer readable storage medium having instructions encoded thereon that, when executed by a processor of a computer system, cause the computer system to perform steps comprising:
    receiving a prompt for an item image generation model, the prompt configured to request the item image generation model to generate item images for an item;
    executing the item image generation model using the prompt to generate a set of item images;
    evaluating each of the set of item images to determine performance data of each of the set of item images, wherein determining the performance data of a generated item image of the set of generated item images comprises:
        displaying the generated item image to a subset of users of an online system,
        logging actions performed by the subset of users after the generated item image is displayed to each of the subset of users, and
        computing a performance metric for the generated item image based on the logged actions; and
    iteratively updating the set of item images by performing a set of steps comprising:
        updating the prompt based on the performance metric of each of the set of item images to obtain a new prompt,
        executing, using the new prompt, the item image generation model to generate a new set of item images, and
        reevaluating the new set of item images to recompute performance data of each of the new set of item images.

11. The computer program product of claim 10, wherein the instructions to update the prompt based on the performance metric of each of the set of item images to obtain the new prompt further comprises instruction that when executed cause the computer system to perform steps comprising:
    applying the prompt and the performance data of each of the set of item images to a machined learned model to determine the new prompt.

12. The computer program product of claim 10, further comprising instructions that when executed cause the computer system to perform steps comprising:
    associating an item image from the new set of item images with the item, wherein the item image is provided to a search engine for providing to users along with a search result returned in response to a search query processed by the search engine.

13. The computer program product of claim 10, further comprising instructions that when executed cause the computer system to perform steps comprising:
    providing an item image from the new set of item images to a search engine for providing to users along with a search result returned in response to a search query processed by the search engine.

14. The computer program product of claim 10, wherein executing the item image generation model using the prompt to generate a set of item images comprises executing the item image generation model using the prompt to generate: (1) an item image of the item where the item is packaged, and (2) an item image of the item where the item is not packaged.

15. The computer program product of claim 10, wherein executing the item image generation model using the prompt to generate a set of item images comprises executing the item image generation model using the prompt to generate: (1) an image of the item depicting its form prior to preparation for consumption, and (2) an image of the item depicting its form after preparation for consumption.

16. The computer program product of claim 10, wherein the item is described by a first feature vector, and a final improved image is generated for the item based in part on the new set of item images, the computer program product further comprising instructions that when executed cause the computer system to perform steps comprising:
    selecting a second item that is described by a second feature vector, and the selection based in part on the second feature vector having at least a threshold similarly score to the first feature vector;
    determining a feature vector for the final improved image for the item; and
    generating an item image for the second item using the feature vector for the final improved image for the item.

17. The computer program product of claim 10, further comprising instructions that when executed cause the computer system to perform steps comprising:
    prior to iterative improvement of the set of item images, predicting that iteratively improving the set of item images for the item is expected to increase a value of the performance metric by at least a threshold value.

18. The computer program product of claim 10, further comprising instructions that when executed cause the computer system to perform steps comprising:
    receiving a second prompt for the item image generation model, the second prompt configured to request the item image generation model to generate second item images for a second item;
    executing the item image generation model using the second prompt to generate a second set of item images;
    evaluating each of the second set of item images to determine performance data of each of the second set of item images;
    predicting that iteratively improving the second set of item images is not expected to increase a performance data metric by at least a threshold value; and
    associating an item image from the second set of item images with the second item, wherein the associated item image is provided to a search engine for providing to users along with a search result returned in response to a search query processed by the search engine.

19. The computer program product of claim 10, further comprising instructions that when executed cause the computer system to perform steps comprising:
    training the item image generation model using the set of item images and the performance data of each of the set of item images.

20. A computer system comprising:
    a processor; and
    a non-transitory computer readable storage medium having instructions encoded thereon that, when executed by the processor, cause the processor to:
        receive a prompt for an item image generation model, the prompt configured to request the item image generation model to generate item images for an item,
        execute the item image generation model using the prompt to generate a set of item images,
        evaluate each of the set of item images to determine performance data of each of the set of item images, wherein determining the performance data of a generated item image of the set of generated images comprising:

display the generated item image to a subset of users of an online system, log actions performed by the subset of users after the generated item image is displayed to each of the subset of users, and compute a performance metric for the generated item image based on the logged actions; and iteratively update the set of item images by causing the processor to:

update the prompt based on the performance metric of each of the set of item images to obtain a new prompt, execute, using the new prompt, the item image generation model to generate a new set of item images, and reevaluate the new set of item images to recompute performance data of each of the new set of item images.

* * * * *